United States Patent [19]
Eidt

[11] 3,719,695
[45] March 6, 1973

[54] NOVEL PROCESS FOR THE PREPARATION OF ALKYLALUMINUM HALIDES OR ALCOHOLATES & TRIALKYLBORANES

[75] Inventor: Scott Hubert Eidt, Seabrook, Tex.

[73] Assignee: Texas Alkyls, Inc., Deer Park, Tex.

[22] Filed: Oct. 20, 1970

[21] Appl. No.: 82,527

[52] U.S. Cl............................260/448 A, 260/606.5 B
[51] Int. Cl.................................................C07f 5/06
[58] Field of Search..................................260/448 A

[56] References Cited

UNITED STATES PATENTS

| | | | |
|---|---|---|---|
| 3,070,630 | 12/1962 | Walde | 260/448 A |
| 3,072,697 | 1/1963 | Jenkner | 260/448 A |
| 3,000,961 | 9/1961 | Dobratz | 260/448 A |
| 2,909,547 | 10/1959 | Ziegler et al. | 260/448 A |
| 2,923,725 | 2/1960 | Nowlin et al. | 260/448 A |
| 3,036,103 | 5/1962 | Johnson | 260/448 A |
| 3,082,232 | 3/1963 | Nowlin et al. | 260/448 A |
| 3,306,924 | 2/1967 | Moretti et al. | 260/448 A |
| 3,399,221 | 8/1968 | Bertoni et al. | 260/448 A |
| 3,361,782 | 1/1968 | Ziegler et al. | 260/448 A |
| 3,245,978 | 4/1966 | Gregorian | 260/94.9 GA |

FOREIGN PATENTS OR APPLICATIONS

| | | | |
|---|---|---|---|
| 826,638 | 1/1960 | Great Britain | |
| 1,357,450 | 2/1964 | France | 260/448 A |

OTHER PUBLICATIONS

Nesmeyanov et al., Methods of Elemento-Organic Chem., North-Holland Publ. Co., Amsterdam, pp. 77 to 80, 452 and 453 (1967).
Chemical Abstracts, Vol. 71, 34001g (1969)

*Primary Examiner*—H. Sneed
*Attorney*—Wayne C. Jaeschke, Martin Goldwasser and Daniel S. Ortiz

[57] ABSTRACT

There is disclosed a convenient process for the simultaneous preparation of alkylaluminum halides or alcoholates and trialkylboranes by means of the reaction between a boron trihalide or trialcoholate and an aluminum trialkyl. Novel dialkylaluminum halides and alkylaluminum alcoholates resulting from this process are also disclosed.

15 Claims, No Drawings

3,719,695

NOVEL PROCESS FOR THE PREPARATION OF ALKYL-ALUMINUM HALIDES OR ALCOHOLATES & TRIALKYLBORANES

BACKGROUND OF THE INVENTION

Alkylaluminum halides or alcoholates, such as shown in the general formula, $R_nALZ_{3-n}$:
where n = 1 or 2; Z = I, Br, Cl, F or OR'
$R = C_xH_{2x+1}$; X = 1–16, preferably 1–6,
$R' = C_xH_{2x+1}$; X = 1–12, preferably 1–4,
are widely used as catalysts for the polymerization of olefins, diolefins, acrylates, olefin oxides, aldehydes, and a wide variety of other unsaturated organic compounds. The alkylaluminum halides are used also for the preparation of organometallic compounds of other metals. In addition, the alkylaluminum fluorides have been used for the preparation of polymers containing aluminum and fluorine atoms.

Alkylaluminum halides have been prepared by a number of routes, some of which are illustrated by the following equations:

1. $4 RX + Al_2Mg \rightarrow 2 R_2AlX + MgX_2$
2. $3 RX + 2 Al \rightarrow R_2AlX + RAlX_2$
3. $R_3Al + 2 X_2 \rightarrow RAlX_2 + 2 RX$
4. $4 R_3Al + 2 Al + 3 X_2 \rightarrow 6 R_2AlX$
5. $R_3Al + HX \rightarrow R_2AlX + R_2AlX + RH$
6. $2 RZnBr + AlCl_3 \rightarrow R_2AlCl + ZnBr_2 + ZnCl_2$
7. $2 R_3Al + AlX_3 \rightarrow 3 R_2AlX$ where X = Cl, Br or I. e.g.

As commercial processes, these routes suffer the following disadvantages: Route 1–5 are, for the most part, restricted to the production of alkylaluminum halides in which the alkyl group is methyl or ethyl; Route 2 produces a equimolar mixture of two alkylaluminum halides; in Route 1, 5 and 6 high percentages of the reactants are converted to by-products which are either of little value, e.g. Route 5, or present transfer problems as the result of their being hydrocarbon-insoluble solids, e.g. Routes 1 and 6; and, the necessity, in Route 6 and 7, of utilizing expensive transfer equipment in handling the moisture-sensitive, solid aluminum trihalides.

The most commonly used process for the production of dialkylaluminum fluorides utilizes the reaction between a dialkylaluminum chloride and anhydrous sodium fluoride. However, this process is very expensive from the standpoint of the labor and time required to effect the isolation and recovery of the desired product. In addition, it produces a solid by-product, sodium chloride, which is of relatively little value, and thus presents expensive disposal problems. The literature describes another method for the production of dialkylaluminum fluorides which involves the reaction, analogous to that in Equation 7 hereinabove, between an aluminum trialkyl and anhydrous aluminum fluoride. Unfortunately, this process is not employed on a large scale basis inasmuch as commercially available anhydrous aluminum fluoride has been found to be unreactive.

Various processes have been investigated as methods for the production of alkylaluminum alcoholates. All of these techniques utilize an oxygen-containing reagent and an alkyl-aluminum compound, usually an aluminum trialkyl. Some of the oxygen-containing reagents include: moisture-free air or oxygen, anhydrous alcohols and aluminum trialcoholates.

The trialkylboranes such as, for example, triethylborane, triisobutylborane, tri-n-butylborane and tri-n-hexylborane, etc., are another class of useful chemical compounds. They are employed as igniters or fuels for jet or rocket engines, as fuel additives, as catalysts for the polymerization of vinyl halides and many other classes of unsaturated organic monomers, and as raw materials for the production of other chemical compounds. Various methods for the preparation of trialkylboranes have been described in the literature. Included among these are, for example, the reaction between:

1. boron trifluoride and dimethylzinc;
2. trimethyl borate or boron trifluoride diethyl etherate and a Grignard reagent;
3. trimethyl borate and methylaluminum sesquiiodide;
4. trialkyl borates and aluminum trialkyls which produces difficulty manipulable aluminum trialcoholates as by-products;
5. boron hydrides, or sodium borohydrides, and aluminum chloride, and various olefins;
6. boric oxide and various alkylaluminum compounds;
7. boron trifluoride or boron trichloride and aluminum trialkyls which produces the difficulty manipulable aluminum trifluoride or aluminum trichloride as a by-product; and, between
8. potassium fluoborate and an aluminum trialkyl.

However, the above listed methods have, in general, been technically inefficient, or have necessitated the use of reactants which are relatively expensive or not readily available, or they produce a by-product which is of little value and which requires considerable effort and expense in its disposal.

It is rather apparent, therefore, that there is a need for providing inexpensive, technically efficient procedures for the preparation of alkylaluminum halides or alcoholates and trialkylboranes.

Thus, it is the prime object of this invention to provide technically efficient procedures for the simultaneous preparation of alkylaluminum halides or alcoholates and trialkylboranes. More particularly, it is the object of this invention to provide a process for simultaneously preparing alkylaluminum halides or alcoholates and trialkylboranes which requires inexpensive, commercially available raw materials, utilizes conventional chemical processing equipment and produces no waste by-product. Various other objects of and advantages of this invention will be apparent from a reading of the disclosure which follows hereinafter.

TECHNICAL DISCLOSURE OF THE INVENTION

It has now been discovered that alkylaluminum halides or alkylaluminum alcoholates and trialkylboranes can be simultaneously prepared by means of the reaction between: (1) an aluminum trialkyl and (2) a boron trihalide or boron trialcoholate. Isolation of the pure products requires only a simple distillation since both products are liquids and the trialkylboranes have boiling points substantially lower, by 100°C. and more, than those of the alkylaluminum compounds which are formed as co-products. Thus, by means of this process, there are simultaneously produced two commercially useful products which are in liquid form and which can, therefore, be transferred by conventional pumping equipment. Moreover, this novel process does not produce any waste by-products which require special solids or gas-handling techniques, special equipment or expensive disposal operations.

Thus, the process of this invention proceeds according to either of the following two equations:

a. $BZ_3 + 3 R_3Al \rightarrow R_3B + 3 R_2AlZ$
b. $2 BZ_3 + 3 R_3Al \rightarrow 2 R_3B + 3 RAlZ_2$ wherein R is an alkyl group and Z is a fluorine, chlorine, bromine or iodine atom or an aromatic, cycloaliphatic and, preferably, an aliphatic alcoholate radical containing from 1–20 and, preferably, from about 1–6 carbon atoms. Both reactions produce a trialkylborane and an alkylaluminum derivative of the boron-containing starting material. Depending upon the type of alkylaluminum compound whose preparation is desired, the stoichiometry indicated by either equation (a) or (b) may be utilized. Thus, equations (a) and (b) apply for the preparation of dialkylaluminum- and monoalkylaluminum compounds, respectively. However, in the event that the trialkylborane is the product of major interest, the reaction illustrated by equation (b) is usually selected. This choice is also influenced by the relative desirability and physical properties of the dialkyl- versus the monoalkyl-aluminum compound.

Both of the above described reactions proceed essentially quantitatively with aluminum trialkyls in which the alkyl group contains from one to sixteen carbon atoms. However, for the purposes of complete separation and high yields of greater than 90 percent of both the trialkyborane and the alkylaluminum compound, the process is preferably limited to the use of aluminum trialkyls having alkyl groups containing no more than about six carbon atoms. This preference does not, however, exclude the preparation and isolation of trialkylboranes or alkylaluminum compounds in which the alkyl group contains from seven to 16 carbon atoms since their preparation can be effected, although with some sacrifice in the yield or purity of one of the products. In addition, it is to be noted that the process of this invention can be used for the preparation of triaryl- and tricycloalkylboranes and the corresponding aryl- and cycloalkylaluminum compounds if the appropriate procedures are employed for the separation of these high-boiling, solid compounds.

Thus, in its broadest aspect, the process of this invention may be said to comprise the simultaneous preparation of organo aluminum halides or organoaluminum alcoholates and triorganoboranes by means of the reaction between: (1) a boron trihalide or alcoholate and (2) a triorganoaluminum having either an aromatic, aliphatic or cycloaliphatic hydrocarbyl radical containing from 1 to 16 and preferably from one to six carbon atoms; this reaction proceeding according to either of the above given equations.

The most suitable aluminum trialkyls for use in this novel process include those in which R is a primary alkyl group such, for example, as a methyl, ethyl, n-propyl, isobutyl, n-butyl, n-amyl, 2-methylbutyl, 3-methylbutyl, neopentyl, n-hexyl, 2-methylpentyl, 3-methylpentyl, 4-methylpentyl, 2,2-dimethylbutyl, 2,3-dimethylbutyl, or 3,3-dimethylbutyl group. Less suitable are those aluminum trialkyls in which the alkyl group is a secondary alkyl radical, e.g., triisopropylaluminum, tri-sec-butylaluminum, etc. Such aluminum trialkyls are relatively rare and they are much less stable thermally than the primary alkyl compounds. Thus, upon heating, they are converted to the isomeric primary alkylaluminum compounds and to dialkylaluminum hydrides and olefins.

This novel process takes advantage of the great difference in the boiling points of the trialkylboranes and the alkyl-aluminum compounds. The trialkylboranes, which are non-polar liquids having boiling points similar to the corresponding hydrocarbons, distill readily at much lower temperature than the highly associated alkylaluminum halides or alcoholates. Because of the low vapor pressures of the latter class of compounds, complete distillation of the trialkylboranes can be effected under conditions in which these compounds are stable. In addition, since the alkylaluminum compounds are liquids under the conditions of the distillation, the mixture in the still pot can be efficiently stirred. Thus, the trialkylborane distills with much greater ease than would be possible from a solid residue which occludes and traps the potential distillate. Moreover, because of the efficient heat transfer through the stirred liquid, the temperature of the mixture is uniform and distillation at a low liquid temperature is facilitated.

Another important advantage of the process of this invention is the ability to transfer the aluminum-containing product from the reaction-distillation vessel by means of conventional liquid transfer equipment. These products, being either mobile liquids or viscous liquids which form homogenous, mobile solutions upon dilution with an inert solvent, such as a liquid hydrocarbon, are conveniently transferred via siphoning or pumping through tubing or piping, etc.

Among the liquid alkylaluminum compounds which can be prepared by means of the process of this invention are five whose preparation has not, heretofore, been described in the literature. Thus, each of the below listed compounds may be looked upon as new compositions of matter which are readily prepared by means of the novel process of this invention. These novel compounds are:

Di-n-butylaluminum fluoride,
Di-n-hexylaluminum fluoride,
Di-n-butylaluminum chloride,
Diisobutylaluminum isopropoxide (isopropylate) and
Isobutylaluminum diethoxide (diethylate).

In conducting this novel process, the first or reaction step involves the addition of the selected boron halide or alcoholate to the aluminum trialkyl in the appropriate molar ratio, i.e. 3:1 $R_3Al:BZ_3$ or 3:2 $R_3Al:BZ_3$, depending upon whether the desired alkylaluminum compound is a dialkyl- or monoalkyl-aluminum derivative. The gaseous boron compounds, i.e. boron trifluoride or boron trichloride, are introduced beneath the stirred surface of the aluminum trialkyl, whereas the liquid boron compounds, e.g. boron trifluoride diethyl etherate and the boron trialcoholates, i.e. the trialkyl borates, are added via a liquid addition funnel or feed tank to the surface of the reaction mixture. The reaction may be conducted at a temperature in the range from about −50° to 350°C. and, preferably, in the range of from about 50°–200°C.

All preparations can be carried out without the use of a solvent. However, in practice, it has been found that the preparation of certain products is facilitated by the use of an appropriate inert solvent. The advantages derived from the use of a reaction solvent in this manner include the ease with which the temperature of the highly exothermic reaction is controlled, the resultant reduction in viscosity of the reaction mixture, as well as the reduction in the extent of side reaction product formation. The preferred reaction solvent is the trialkylborane itself since it is one of the reaction products. In addition to the trialkylborane, an aromatic hydrocarbon, a liquid saturated aliphatic hydrocarbon, i.e. an alkane or cycloalkane, an ether such as diethyl ether or tetrahydrofuran, or a low molecular weight tertiary amine, e.g., triethylamine, can also be employed as the reaction solvent. While the ethers and trialkylamines form complexes or stable addition compounds with the aluminum trialkyls, they do not form stable complexes with the alkylaluminum fluorides or alcoholates. Also, the ethers do not complex with the trialkylboranes.

The liquid boron compounds should be added to the aluminum trialkyl rather than the reverse order of addition. Thus, when alkylaluminum fluorides are being prepared from boron trifluoride etherate, the reverse order of addition would cause the formation of aluminum fluoride and uncomplexed diethyl ether in the very early stages of the addition. Reaction of the aluminum fluoride thereby formed with subsequently added aluminum trialkyl would require undesirably high temperatures.

The aluminum trialkyls which are used as starting materials should be relatively free of dialkylaluminum hydrides since the latter are precursors for dialkylboron hydrides and dialkyldiboranes as potential side reaction products. Moreover, in the preparation of alkylaluminum fluorides, the trialkylaluminum raw material should contain little or no olefin of the type which can be polymerized to a polyolefin in the presence of boron trifluoride or boron trifluoride etherate.

In the preparation of alkylaluminum halides, especially where no complexing solvent is employed, the reaction is essentially instantaneous. Thus, the reaction step may be considered complete when the charging of the boron trihalide has been terminated. However, in the preparation of alkylaluminum alcoholates, the reaction mixture is ordinarily heated after the charging of the reactants has been completed. Although the aluminum trialkyl-boron trialcoholate reaction is quite exothermic, the additional heating period is employed in order to insure the completion of the reaction.

Following the reaction step, the components of the mixture are separated by distillation. In the event that boron trifluoride etherate is used as a reactant, or where a reaction solvent other than the trialkylborane product is employed, the ether or other solvent is the first component to be distilled. In general, while the conditions employed for distillation of the solvent are determined by its volatility, the terminal conditions for its complete removal usually include the use of moderately reduced pressures, i.e. of vacuum distillation.

The terminal pressures and the still pot liquid temperatures used for complete distillation of the trialkylborane depend, to a large extent, upon the volatility of the trialkylborane and the viscosity of the alkylaluminum compound. Thus, in the case of triethylborane-diethylaluminum fluoride mixtures for example, although the boiling point of triethylborane is 95°C. at atmospheric pressure, the triethylborane-diethylaluminum fluoride mixture is heated to approximately 130°C. under moderately reduced pressure to effect complete removal of the boron compound. The use of a relatively high vacuum distillation pressure and liquid temperatures higher than 100°C. is more efficient than a lower pressure-lower temperature combination since the triethylborane is more readily condensed and the viscosity of the diethylaluminum fluoride is drastically lower. The latter fact has a significant effect on the ease of removal of the final amounts of triethylborane from diethylaluminum fluoride. Since the dialkylaluminum fluorides in which the alkyl group is larger than ethyl are not extremely viscous liquids, as are dimethyl- and diethylaluminum fluoride, these higher molecular weight compounds need not be heated to high temperatures in order to be mobile. This reason, along with the significantly higher boiling points of the higher trialkylboranes, accounts for the fact that the latter compounds are distilled at considerably lower pressures than are used for triethylborane. In addition, the complete distillation of the trialkylboranes with longer alkyl chains should be effected rapidly and at as low a temperature as is practically possible in order to minimize thermal decomposition of these trialkylborane to hydride-containing alkylboranes.

An important feature of this process is that it produces alkylaluminum halides and alcoholates that need not be distilled in order to be of sufficient purity for use in most applications. This feature is highly attractive because the thus prepared compounds have very low vapor pressures and some have extremely high viscosities as exemplified by dimethyl- and diethylaluminum fluoride. Thus, the viscosity of the latter compound is so great that the liquid has no practical flow rate at temperatures below 90°C. and, except at inconveniently high temperatures, it cannot be transferred, as the pure liquid, from one container to another. Accordingly, diethylaluminum fluoride is ordinarily transferred in process equipment, analyzed, and shipped as a hydrocarbon solution.

The following examples will further illustrate the embodiment of this invention. In these examples, all parts given are by weight unless otherwise noted.

EXAMPLE I

This example illustrates the preparation of triethylborane and diethylaluminum fluoride by means of the reaction of gaseous $BF_3$ with triethylaluminum in triethylborane solvent.

Into a reaction flask fitted with an efficient, vacuum-tight stirrer, a gas bubbler tube, and a distillation condenser are charged 343 g (3.0 moles) of triethylaluminum and 196 g (2.0 moles) of triethylborane. Beneath the surface of this solution, there is fed 68 g (1.0 mole) of gaseous boron trifluoride while the temperature of the reaction solution is maintained in the range of 20°-70°C. The temperature of the highly exothermic reaction is controlled by regulation of the boron trifluoride charge rate and the temperature of the heat exchange liquid surrounding the reaction flask. Because the reaction is practically instantaneous, no boron trifluoride passes through the mixture and no additional reaction time is necessary after completion of the boron trifluoride charging.

The triethylborane, 290 g, which represents a 96 percent yield, is distilled into a dry-ice-cooled receiver fitted with a dry ice condenser. Approximately one-half of the triethylborane is distilled at atmospheric pressure while the vapor temperature is 95°C. and the remainder is distilled at 20 mm Hg., while the triethylborane is condensed by the dry ice condenser. During the removal of the final amount of triethylborane, the very viscous diethylaluminum fluoride is stirred at temperatures up to 130°C. Following the addition of 312 g of dry n-heptane to the diethylaluminum fluoride which is being stirred at 90°-100°C, there is obtained 621 g of a moderately viscous diethylaluminum fluoride-heptane solution having a density of 0.77 g/ml at 38°C. Based upon the weight percentages aluminum (12.9) and fluoride (9.1) in the solution, and the weights of added heptane and of solution, the yield of diethylaluminum fluoride is 309 g, or 99 percent of theory. In contrast to the undiluted diethylaluminum fluoride which is too viscous to be manipulated conveniently, the 50 percent, by weight, diethylaluminum fluoride-heptane solution is readily transferred and analyzed by techniques routinely employed for pyrophoric liquid aluminum alkyls.

EXAMPLE II

This example illustrates the preparation of triisobutylborane and diisobutylaluminum fluoride by means of the reaction of gaseous $BF_3$ with triisobutylaluminum etherate.

Into a reaction flask fitted with a gas bubbler tube, addition funnel, and distillation condenser, there is placed a 250 gram quantity (12 percent excess) of anhydrous diethyl ether. To the well-stirred ether, there are added, dropwise, 595 g (3.0 moles) of commercial grade triisobutylaluminum having a low hydride content. The resultant solution of triisobutylaluminum etherate is heated to 60°C. while vacuum is applied to the system until a pressure of 100 mm Hg is reached. To the residual triisobutylaluminum etherate, which contains very little isobutylene or diethyl ether, there is fed 69 g (1.02 moles) of gaseous boron trifluoride. During the addition, the reaction temperature is maintained in the range of 60°-90°C.

Following the reaction step, all of the ether is distilled by heating the liquid to 140°C. as the pressure is reduced to 200 mm Hg whereupon, at 8 mm Hg, 171 g of triisobutylborane (94 percent of theory) is distilled at 65°-67°C. Remaining in the still pot is 471 g (98 percent of theory) of slightly viscous diisobutylaluminum fluoride. Upon distillation of approximately 25 percent of this liquid at 125°-127°C. and 0.1 mm Hg, there is obtained a distillate and residual still pot liquid with essentially the same composition as the diisobutylaluminum fluoride prior to distillation.

EXAMPLE III

This example illustrates the preparation of tri-n-butylborane and di-n-butylaluminum fluoride by means of the reaction of boron trifluoride etherate with tri-n-butylaluminum.

To 595 g (3.00 moles) of tri-n-butylaluminum in a reaction flask containing a magnetic stirrer, there are added, dropwise, 143 g (1.01 moles) of boron trifluoride etherate. The temperature of the exothermic reaction mixture is maintained in the range of 50°-80 °C. during the addition. The mixture is heated to 100°C. for distillation of most of the ether at atmospheric pressure, whereupon, by reducing the pressure to 100 mm Hg and heating the stirred liquid to 150°C., the remainder of the ether is distilled. Distillation at 1 mm Hg and a terminal liquid temperature of 150°C. produces 169 g (93 percent yield) of tri-n-butylborane boiling at 50°-51°C. There remains in the still pot 476 g (99 percent of theory) of di-n-butylaluminum fluoride which is characterized as a moderately viscous liquid with a very low vapor pressure estimated as 0.1 mm Hg at approximately 160°C. Based upon the weight percentages of aluminum and fluoride which are 16.5 and 11.7, respectively, the product is 98 percent, by weight, of di-n-butylaluminum fluoride (theory: Al, 16.84; F, 11.86).

EXAMPLE IV

This example illustrates the preparation of tri-n-hexylborane and di-n-hexylaluminum fluoride by means of the reaction of boron trifluoride etherate with tri-n-hexylaluminum.

To 593 g (2.1 moles) of tri-n-hexylaluminum, there are added, dropwise, 100 g (0.70 mole) of boron trifluoride etherate. During the addition, the temperature of the exothermic reaction is in the range of 65°-85C. The diethyl ether is then distilled from the mixture by progressively reducing the pressure to a minimum of 20 mm Hg while increasing the temperature of the liquid to 170°C. Vacuum distillation at 0.2-0.3 mm Hg provides a 174 g (93 percent yield) of tri-n-hexylborane boiling in the range 105°-108°C. Remaining in the still pot as a moderately viscous, colorless liquid is 450 g, representing a 99 percent yield, of di-n-hexylaluminum fluoride. This compound has a vapor pressure of less than 0.2 mm Hg at 175°C. It is thermally stable at these conditions, i.e., it does not undergo decomposition. Analysis provides weight percentage values for aluminum of 12.4 and for fluoride of 8.8 which are in excellent agreement with those calculated (Al, 12.47; F, 8.78) for pure di-n-hexylaluminum fluoride.

EXAMPLE V

This example illustrates the preparation of tri-n-butylborane and di-n-butylaluminum chloride by means of the reaction of boron trichloride with tri-n-butylaluminum.

Into a reaction flask containing a magnetic stirring bar and fitted with a gas bubbler tube and a distillation condenser, there are charged 500 ml of dry n-hexane and 595 g (3.0 moles) of tri-n-butylaluminum. Beneath the surface of this stirred solution, there is fed 118 g (1.01 moles) of gaseous boron trichloride while the temperature of the reacting solution is maintained in the range of 15°-60°C. The mixture is then heated to 120°C. during which time the major portion of the n-hexane is distilled. Complete removal of the n-hexane is effected by reducing the pressure to 50 mm Hg and heating the stirred liquid to 130°C. whereupon at a pressure of 1 mm Hg and a terminal liquid temperature of 140°C., there is distilled 170 g (93 percent yield) of tri-n1butylborane boiling at 50°–51°C. Remaining in the still pot is 518 g (98 percent yield) of di-n-butylaluminum chloride. As indicated by the analytical data given below, this clear, colorless liquid is sufficiently pure for most applications so that additional purification by vacuum distillation (bp 108°–110° at 0.07-0.09 mm Hg) is unnecessary. Analysis reveals 15.0 percent w aluminum and 19.9 percent w chlorine, indicating that 98 percent, by weight, of the liquid is di-n-butylaluminum chloride having an atomic ratio chlorine/aluminum equal to 1.01.

EXAMPLE VI

This example illustrates the preparation of triisobutylborane and diisobutylaluminum isopropoxide by means of the reaction of triisopropyl borate with triisobutylaluminum.

To 2,380 g (12 moles) of triisobutylaluminum stirred in a reaction flask, there are added 752 g (4 moles) of triisopropyl borate over a 3-hour period. The temperature of the exothermic reaction mixture is maintained in the range of 15°–60°C. during the addition step and is then increased to 170°C. over a 2-hour heating period. After allowing the mixture to cool to 80°C., the pressure is then reduced to 10 mm Hg and there is distilled 693 g of triisobutylborane (95 percent yield) boiling at 71°–72°C. Because of its very high boiling point, i.e. 125°C. at 0.025 mm Hg, very little of the diisobutylaluminum isopropoxide distills with the triisobutylborane.

Remaining in the still pot is 2,350 g (98 percent yield) of diisobutylaluminum isopropoxide. Utilizing the protection of a nitrogen atmosphere, this clear, colorless, moderately viscous liquid is readily transferred at ambient temperatures. Based upon its aluminum and isopropoxide content, 13.3 percent w and 29.5 percent w, respectively, this undistilled diisobutylaluminum isopropoxide is sufficiently pure (98 percent w) for most applications. Except for the presence of a trace quantity of triisobutylborane, the diisobutylaluminum isopropoxide produced by this process is undistinguishable from that obtained via reaction of equimolar quantities of isopropyl alcohol and triisobutylaluminum.

EXAMPLE VII

This example illustrates the preparation of triisobutylborane and diisobutylaluminum ethoxide by means of the reaction of triethyl borate with triisobutylaluminum.

To 595 g (3.0 moles) of triisobutylaluminum, there are added, dropwise, 146 g (1.0 mole) of boron triethylate over a 2-hour period. The temperature of the exothermic reaction is maintained in the range of 10°–80°C. during the addition step and is then increased to 130°C. during a 1-hour heating period. After allowing the mixture to cool to 80°C., the pressure is then reduced to 10 mm Hg and 171 g of triisobutylborane (94 percent yield) boiling at 71°–72°C. is distilled. Remaining in the still pot is 540 g (97 percent yield) of diisobutylaluminum ethoxide (ethylate). This clear, colorless liquid is sufficiently pure for most applications and additional purification by distillation (bp 124°–125°C. at 2 mm Hg) is therefore unnecessary. Except for the presence of a trace quantity of triisobutylborane, the diisobutylaluminum ethoxide (ethylate) is indistinguishable analytically from that obtained via reaction of equimolar quantities of anhydrous ethanol and triisobutylaluminum. The moderately viscous liquid is readily transferred by conventional liquid transfer equipment.

EXAMPLE VIII

This example illustrates the preparation of triisobutylborane and isobutylaluminum diethoxide by means of the reaction of triethyl borate with triisobutylaluminum.

To 595 g (3.0 moles) of triisobutylaluminum, there are added, dropwise, 292 g (2.0 moles) of triethyl borate (boron triethylate) over a 3-hour period. The temperature of the reaction is maintained in the range of 10°–100°C. during the addition step and is then increased to 170°C. over a 2-hour heating period. A total of 340 g (93 percent yield) of triisobutylborane boiling in the range 71°–72°C. at 10 mm Hg is thereupon distilled. Remaining in the still pot is 512 g (98 percent yield) of isobutylaluminum diethoxide (diethylate). Analysis of this very viscous, although mobile, liquid reveals 15.2 wt. percent aluminum (Theory–15.49 percent). Hydrolysis of a sample of this liquid yields 0.518 g of ethanol per gram of product which indicates a ratio of 2.00 ethoxy/aluminum units.

Variations in proportions, procedures and materials may be made without departing from the scope of this invention as defined in the following claims.

What is claimed is:

1. A process for simultaneously preparing an organoaluminum alcoholate of the formula $R_2AlZ$ and a triorganoborane compound of the formula $BR_3$ by reacting (1) a boron alcoholate of the formula $BZ_3$ and (2) a triorganoaluminum compound of the formula $R_3Al$ wherein R is an aliphatic, cycloaliphatic or aromatic hydrocarbyl radical containing from one to 16 carbon atoms and Z is selected from the group consisting of aliphatic, cycloaliphatic or aromatic alcoholate radicals containing from one to 20 carbon atoms; said process comprising the steps of (i) admixing said boron alcoholate compound with said triorganoaluminum compound in a molar ratio of about 1 mole of boron alcoholate per 3 moles of organoaluminum compound; and (ii) removing said triorganoborane from the resulting reaction product by distillation.

2. The process of claim 1, wherein said boron alcoholate is a boron trialcoholate with an aliphatic portion containing from one to six carbon atoms.

3. The process of claim 1, wherein said triorganoaluminum compound is a trialkylaluminum compound having an alkyl group containing from 1 to 6 carbon atoms.

4. The process of claim 1, wherein said boron alcoholate is added to said triorganoaluminum compound.

5. The process of claim 1, wherein the reaction temperature during step 1 is maintained in the range of between about −50° and 350°C.

6. The process of claim 5, wherein the reaction temperature during step 1 is maintained in the range of between about 50°–200°C.

7. The process of claim 1, wherein step 1 is conducted in the presence of an inert solvent.

8. The process of claim 7, wherein said solvent in step 1 is selected from the group consisting of aliphatic and aromatic hydrocarbons, ethers and tertiary amines.

9. The process of claim 7, wherein said solvent in step 1 is the triorganoboron compound which will result from the reaction.

10. The process of claim 1, wherein said distillation in step 2 is conducted at atmospheric pressure.

11. The process of claim 1, wherein said distillation in step 2 is conducted at reduced pressures and at elevated temperatures.

12. The process of claim 1, wherein as an additional step the said organoaluminum alcoholate is dissolved in a hydrocarbon solvent.

13. A process for simultaneously preparing triisobutylborane and diisobutylaluminum ethoxide, said process comprising reacting triethyl borate with triisobutylaluminum in a molar ratio of about 1 mole of borate per about 3 mole of triisobutylaluminum and removing said triisobutylborane from the resulting reaction product by distillation.

14. The process of claim 13, wherein said reaction is initiated by adding said triethyl borate to said triisobutylaluminum.

15. A process for simultaneously preparing triisobutylborane and diisobutylaluminum isopropoxide, said process comprising reacting triisopropyl borate with triisobutyl aluminum in a molar ratio of about 1 mole of borate per 3 moles of triisobutylaluminum and removing said triisobutylborane from the reaction product by distillation.

* * * * *